Figure 1:
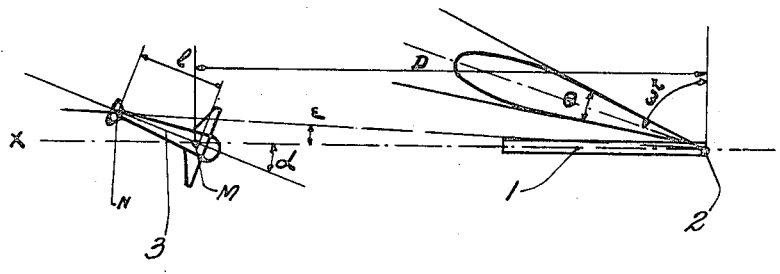

July 21, 1953  P. PÉRILHOU  2,646,564
RADIO NAVIGATION SYSTEM
Filed Feb. 17, 1949  2 Sheets-Sheet 1

Inventor
Pierre Périlhou
by Brown & Seward
Attorneys

July 21, 1953  P. PÉRILHOU  2,646,564
RADIO NAVIGATION SYSTEM
Filed Feb. 17, 1949  2 Sheets-Sheet 2
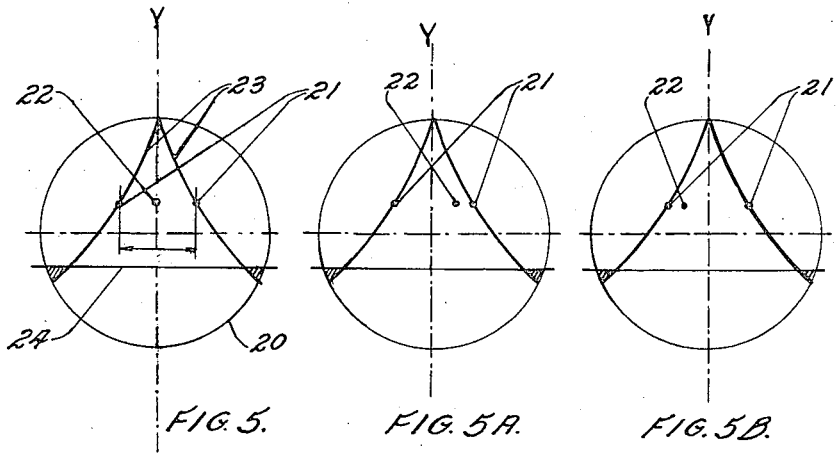
FIG. 5.  FIG. 5A.  FIG. 5B.
Fig. 4
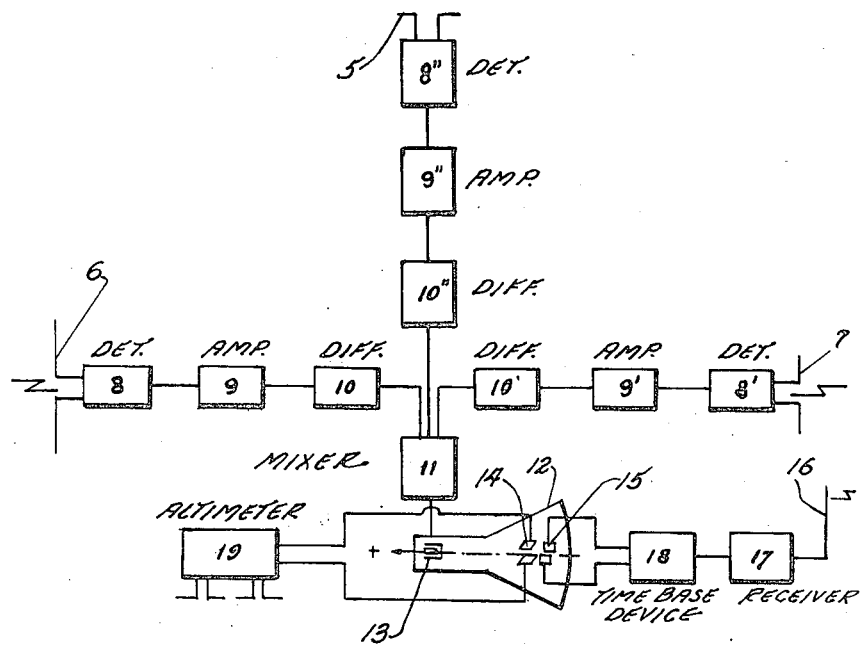
Inventor
Pierre Périlhou
by Brown & Seward
Attorneys Patented July 21, 1953

2,646,564

UNITED STATES PATENT OFFICE 2,646,564

RADIO NAVIGATION SYSTEM

Pierre Périlhou, Clamart, France, assignor to Office National d'Etudes et de Recherches Aeronautiques, Paris, France, a French company Application February 17, 1949, Serial No. 76,984
In France February 19, 1948

18 Claims. (Cl. 343—106)

This invention relates to the problem of guiding of a dirigible craft following a predetermined path with respect to ground by means of signals of radiant or wave energy.

The invention concerns more particularly the determination or indication on a moving craft such as an aircraft of the angle of relative orientation of its longitudinal axis with respect to a followed direction or path relative to the ground. In fact, it is interesting in a number of cases and especially in the field of blind landing of aircrafts, to know at every instant the angle formed by the longitudinal axis of the craft with the path followed thereby with respect to ground.

More particularly, in the case of a blind landing of an aircraft, the latter must follow a straight line the horizontal projection of which must coincide with the axis of the landing strip on which the craft must land. If there exists at that time a wind having a lateral component with respect to the axis of the landing strip, the aircraft normally advances with its longitudinal axis making a certain angle with the axis of the landing strip in the direction opposing the wind. Accordingly, to effect a correct landing under such conditions, it is necessary to impart to the craft, just before the touch down, a change of heading bringing its longitudinal axis into coincidence with that of the landing strip. To effect such a correction, it is necessary therefore to know the angle formed between said two axes at the moment just preceding the touch down. This angle in normal visibility conditions may be appreciated directly from the observation of the movement of the craft with respect to ground, but in conditions of blind landing this angle must be determined and indicated to the pilot by special means. On the other hand, in the case of an automatic landing, it is generally interesting to know completely the position of the craft with respect to the plane of landing, including the angle formed by the vertical longitudinal plane of symmetry of the craft with the vertical plane containing the landing trajectory or glide path.

Accordingly, an object of the invention is to provide a new method and means giving a solution to the problem of determining and indicating the above specified angle.

Another object of the invention is to provide a new method for determination and indication of the specified angle comprising the use of radio electric means and consisting in providing on the craft at least two independent receiving aerials spaced apart from each other and suitably disposed on the craft, in causing said aerials to cooperate with one or several transmitters, provided on the ground and transmitting radiations presenting a characteristic variable with time and in comparing in relation to time the effects of reception of said aerials in order to obtain and indicate the sense and the value of said angle.

According to a feature of the invention, it is suggested to use on the craft two spaced aerials arranged at two points aligned following the longitudinal axis of the craft and located respectively at the front and the rear parts thereof, to cause these aerials to cooperate with a very high frequency radio beacon of a rotating beam type and to obtain the measure of the angle specified above by a comparison in relation to time of the instants of passage of said beam by said two aerials, the time interval elapsing between said instants giving a measure of said angle.

According to another feature of the invention, it is suggested to use on the craft two aerials arranged as indicated in the preceding paragraph i. e. at two points aligned following the longitudinal axis of the craft, to cause these aerials to cooperate with two synchronously operated ground transmitters adapted to transmit radiations presenting a characteristic variable with time and to obtain the measure of the angle defined above from the comparison of variations shown by the radiations incoming from said two transmitters upon their arrival on each of said receiving aerials carried by the craft.

According to a further feature of the invention, it is suggested to use on the craft three independent receiving aerials spaced apart from each other and comprising namely two aerials provided at the wing tips of the craft or in general symmetrically aranged spanwise with respect to the craft and an aerial located on the longitudinal axis of the craft at the tail or the front part thereof, or in general outside of the base line formed by the first aerials, to cause these aerials to cooperate with a very high frequency radio beacon of a rotating beam type and to obtain the measure of the specified angle by comparing on a time base the respective instants of passage of said beam by said three aerials.

A still further feature of the invention is to provide a method according to which it is suggested to use on the craft three spaced receiving aerials relatively located or arranged as specified in the preceding paragraph, to cause said aerials to cooperate with a transmission base line formed on the ground by two synchronized transmitters adapted to transmit ultra high frequency radiations presenting a characteristic variable with time and to obtain the measure of the specified angle by the comparison of variations shown by the radiations incoming from each of said transmitters upon their arrival on the three aerials.

The invention consists furthermore in an application of the specified method with the help of three independent and spaced aerials provided on a craft and a very high frequency radio beacon of a rotating beam type, in accordance with one of the features specified above, and in which said indication is produced or obtained in association or simultaneously with those of the distance of the craft to said radio beacon and the lateral displacement thereof with respect to the desired path, in accordance with the disclosure of an earlier application of the same applicant dated September 22, 1948, Serial No. 51,442, so that this indication of the angle between the longitudinal axis of the craft and the path followed thereby with respect to the ground is produced on the screen of a cathode ray tube oscilloscope by an auxiliary luminous signal or point adapted to move laterally on either side of a vertical diameter or reference line on said screen.

Besides, the invention consists furthermore in a reduction to practice of the above specified method with the help of an indicating arrangement according to the above mentioned earlier patent application and in which the indication of the specified angle is produced on a screen of an oscilloscope by a luminous point appearing simultaneously with two other signal points the spacing of which represents the distance remaining to be flown to a given point of landing and a middle point representing the altitude of the craft above the ground track, said point of drift angle and the point of altitude being distinguished one from the other by different colours or luminous intensities.

Finally, in accordance with another feature of the invention, it is contemplated in the case of an embodiment such as defined in the two preceding paragraphs, to suppress under certain conditions the signal point indicating said drift compensating or course angle, for instance when the signal points indicating the distance are closely approaching each other or when the altitude is too great.

The above and other objects and features of the invention will appear more fully from the following description and the annexed drawings, it being understood however that said drawings are given for the purpose of illustration only and cannot be considered as defining the scope of the invention for which reference will have to be made to the appended claims.

Figure 2:
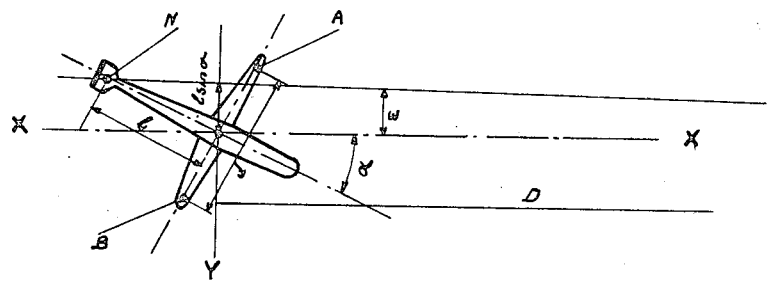
Figure 3:
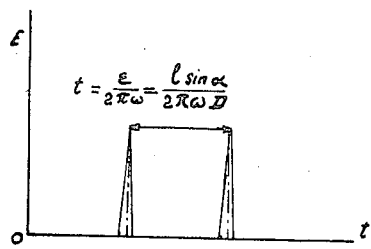

In the drawings, Figs. 1, 2 and 3 are diagrams illustrating the principle of the method according to the invention, Fig. 4 shows a schematic diagram of two embodiments of the receiving arrangement to be provided on the craft and, Figs. 5, 5a, 5b show three views of the screen of a cathode ray tube oscilloscope illustrating the indication of the drift compensating angle of the craft simultaneously with distance of the craft to the point of landing and lateral deviations of the craft from the desired path toward said point.

Referring now to Figs. 1 and 2, there is shown a landing strip I the axis of which is designated by reference letters X—X'. This landing strip is provided at its remote end with a very high frequency radio beacon of a rotating beam type schematically indicated at 2. Reference numeral 3 designates an aircraft progressing following the axis of landing X—X with a certain angle of drift compensation $a$. Aircraft 3 is provided with two spaced aerials M and N arranged at two points aligned following the longitudinal axis and respectively located one at the mid-distance of the wing span of the craft and the other at the rear part of the fuselage. By designating by $\epsilon$ the angle under which distance I between the two aerials M and N is visible from radio beacon 2 for an angle of drift compensation $a$, it appears clearly from the consideration of Fig. 2, that by taking into account the value of distance D between the craft and radio beacon 2 which remains always great in comparison to said distance I between the two aerials, the tangent of angle $\epsilon$ is equal to the ratio of the normal projection of distance I on a perpendicular to axis X—X passing through antenna M, to distance D. In view of a reduced value of angle $\epsilon$, this angle may be taken as equal to its tangent, which permits to write that this angle is substantially equal to $$\frac{1 \times \sin \alpha}{D}$$

As this angle precisely corresponds to the angle swept by the rotating beam when the latter passes from antenna N to antenna M in the example shown, it is appearent that time $$t = \frac{\epsilon}{2\pi\omega}$$

required for the beam rotating with a speed $\omega$ to sweep this angle $\epsilon$ may serve as a measure of angle $a$ for a given distance D between the craft and the radio beacon.

The measure of time $$t = \frac{\epsilon}{2\pi\omega}$$

and consequently of the angle of drift compensation or in general angle $a$ may be obtained thus by determining the time interval between the instants of passage of the rotating beam by the two aerials M and N, this time interval being null if angle $a$ is null and variable as to its sense and value in accordance with the direction and the value of angle $a$ formed by the longitudinal axis of the craft and the path followed by the latter.

According to the invention, the indication of this angle may be obtained by associating, with the two aerials, suitable receiving means permitting to use the signal voltages induced therein when the same are successively swept by the rotating beam, to produce two short duration pulses which may be then compared as regards their relative spacing in relation to a time base to give the desired indication, said time base being controlled by a reference signal generally an omni-directional signal, defining the instant of passage of the rotating beam by a predetermined direction making a certain angle with the desired direction of guidance, whereby said pulses are coincident with each other if angle $a$ is null and spaced one from the other in one or the other direction as shown in Fig. 3 by a distance $$\frac{1 \sin \alpha}{2\pi\omega D}$$

i. e. a distance dependent on value $$\frac{1 \sin \alpha}{D}$$

and hence proportional for a given distance D to angle $\alpha$.

By determining and combining if necessary this indication with the indication of distance D separating the craft from the transmitter, it is possible thus to determine at every moment the angle of drift compensation or in general angle $\alpha$.

A possible embodiment of the apparatus which may be used for the purpose of producing an indication of said drift compensating angle or in general angle $\alpha$ defined above, by means of two aerials M and N located on the longitudinal axis of the craft, as shown in Fig. 1, will be explained with reference to Fig. 4 assuming that elements 5, 8'', 9'', 10'' and 19 are dispensed with and that aerials 6 and 7 represent areials M and N of Fig. 1. Thus, these aerials are associated with receiving means comprising detectors 8, 8', amplifiers 9, 9', and differentiators or pulsers 10, 10'. The latter are connected by their outputs to a mixer 11 which latter controls a Wehnelt 13 of a cathode ray tube oscilloscope 12. This oscilloscope is provided with vertical deflection plates 14 which remain, in the assumed conditions, ineffective and horizontal deflection plates 15 connected to a time base device 18 triggered by the output of a receiver 17 coupled to an auxiliary aerial 16 adapted to receive the reference signal so as to control said time base device 18. In this arrangement, the signals induced by each of the aerials 6 and 7 are transformed, after detection and amplification, into sharply defined short duration pulses, such as shown in Fig. 3 and which being applied to Wehnelt 13 of the tube 12 produce on the screen of the tube upon each sweep of the rotating beam, two luminous signals such as points or spots differing from each other by their size, colour or brightness and respectively corresponding to front aerial M and to rear aerial N, these two signal points or signs, appearing at the center of the screen, coincide one with the other, when angle $\alpha$ is null and the craft is following the desired path and one of these points moving to one or the other side of the other point upon a change of orientation of the craft in one or in another direction when the craft, while following the prescribed path, makes an angle $\alpha$ of one or another sense with said path.

The differentiator arrangements 10 and 10' may be advantageously formed by devices of the type covered by a copending application dated September 9, 1948, and filed under Serial No. 48,487, whereby the instants of passage of the beam by the respective aerials are sharply defined by short duration pulses produced at a predetermined point of the signal duration characteristics of the received signals.

The above arrangement may be combined with a distance and lateral displacement indicating equipment of an earlier copending application Serial No. 50,514, filed on September 22, 1948, involving the use of two independent receiving aerials spaced apart transversally to the craft and preferably located at the wing tips thereof, the passage of the rotating beam by said aerials giving rise to short duration pulses used to produce on a cathode ray tube oscilloscope two signal points the relative spacing of which gives the measure of distance and their lateral displacement with respect to a centred position relative to the vertical diameter of the screen indicating lateral deviations of the craft from the desired path.

In such a combination, the signals received by the two pairs of aerials will be effective to produce on the same screen the indication of angle $\alpha$ and the indications of distance and lateral deviations of the craft referred to above.

The measure of angle $\alpha$ defined hereinabove may be also obtained by using in combination with two aerials located as previously described on the craft along its longitudinal axis, of a transmission base comprising two synchronously operated frequency modulated transmitters symmetrically located on either side of the axis of desired guidance as previously suggested in an earlier application of the same applicant filed September 24, 1948, under Serial No. 51,028.

In such a case, by receiving on each of said aerials the signals from said two transmitters, one obtains a beating frequency of a zero value on both aerials, or a beating frequency of zero value on one of the aerials and a beating frequency of a no null value on the other of said aerials or also different beating frequencies on said two aerials, depending on whether the aircraft is aligned with its longitudinal axis with the desired direction or path with respect to ground or makes a certain angle with said path, one of said aerials being on said path and the other out of said path or else both aerials being not on said path. The algebraic difference between said beat frequencies, which may be considered to be substantially equal to:

$$\frac{1 \sin \alpha}{D}$$

so that for a given distance D, it is proportional to the drift compensating angle $\alpha$ may serve as a measure of said angle. In this case, also, it is necessary to obtain by separate means distance D between the craft and the transmission base formed by the two transmitters and to introduce into or combine said measure with the above specified indication in order to render said indication independent of said distance.

As it has been already indicated in the preamble of the description, angle $\alpha$ may be determined with advantage by using on one hand on the craft such as an aircraft three receiving aerials as shown in Fig. 2 including two aerials mounted on the wing tips of the craft and on aerial placed on the longitudinal axis of the craft, for instance at the rear part of the fuselage, and by providing on the other hand on the ground one or several transmitters adapted to transmit radiations presenting a characteristic variable with time and to obtain the measure of angle $\alpha$ by comparing the effects of reception of said aerials.

A particularly interesting embodiment of the above system may be obtained by using in combination with the three receiving aerials such as specified above a very high frequency radio beacon of a rotating beam type adapted to co-operate with the two lateral aerials in accordance with the copending application Serial No. 51,422, dated September 22, 1948, so that the instants of passage of the beam by said lateral aerials are indicated by short duration pulses or tops adapted to produce on the screen of a cathode ray oscilloscope two luminous signals or points the spacing of which gives the measure of distance of the craft to the radio beacon and lateral displacements of which form a centred position with respect to the vertical diameter of said screen gives an indication of lateral displacement of the craft from the desired path, these points being further controlled vertically in accordance with the altitude of the craft and related with curves expressing a desired relation between the altitude and distance for effecting a blind landing following a desired glide path. In accordance with the present invention, the third or tail aerial is adapted to cooperate with the system of the above mentioned earlier application so as to provide on the screen of the oscilloscope, between the points of distance, a third luminous signal or point normally occupying a central position for α=0 and laterally displaceable from said position according to the sign and the amplitude of said angle α. For this purpose, the tail aerial may be provided with the same receiving means as the two lateral aerials and adapted to control conjointly with said two aerials the cathode ray tube oscilloscope, which on the other hand, is controlled by an additional receiving aerial adapted to receive a reference signal generally of an omni-directional type defining the instant of passage of the beam by a direction making a predetermined angle with respect to the desired path or direction to be followed by the craft.

Fig. 4 of the drawings illustrates an embodiment of such an arrangement in which the two lateral aerials are indicated at 6 and 7 and the tail aerial at 5. The receiving means associated with said three aerials comprise respectively detectors 8, 8' and 8", followed by amplifiers 9, 9' and 9" and differentiators 10, 10' and 10". The latter are connected by their outputs to a mixer 11 the output of which is connected to Wehnelt 13 of a cathode ray tube oscilloscope indicated generally by reference numeral 12. This tube is provided with the horizontal deflection plates 15 connected to a time base device 18 controlled by the reference signal produced on the ground at the moment of passage of the beam by a direction making a certain angle with the desired direction of path to be followed by the craft such as the axis of a landing strip, this signal being received by an auxiliary aerial 16 feeding a receiver 17 connected to said time base device 18 to trigger the same. The tube 12 is further provided with a pair of vertical deflection plates 14 adapted to be controlled by an absolute altimeter indicated at 19.

With this arrangement considering first the two aerials A and B of Fig. 2 and shown in Fig. 4 at 6 and 7, there are produced on the screen of the tube, as explained in detail in the copending application filed on September 22, 1948, under Serial No. 51,442 and shown in Fig. 5, two luminous points 21 determined by pulses resulting from the passage of the rotating beam by said two aerials 6 and 7, the relative spacing of said points one from the other giving a measure of the distance remaining to be flown to a desired point of landing, while lateral displacement of said points with respect to the vertical diameter of the screen indicating deviations of the craft to one or another direction with respect to the vertical plane containing the direction of guidance. As a result of the control imposed on the cathode ray by the absolute altimeter 19, the two points 21 are further movable vertically in accordance with the altitude of the craft, with reference to a ground line 24. The screen is further provided with two downwardly diverging curves 23 translating the relation to be maintained upon landing between the altitude of the craft and its distance to the point of landing, in order to maintain the craft on a correct glide path.

Considering now the operation of the tail aerial such as indicated at N in Fig. 2 and at 5 in Fig. 4, the signal induced therein, by the passage of the beam, gives rise, due to the action of the corresponding differentiator 10", to a short duration pulse which, applied to Wehnelt 13 of the cathode ray tube oscilloscope 12, produces a luminous point 22 intermediate the two distance points 21, this point being equidistant with respect to said distance points 21 if angle α is null and is displaced laterally toward one or the other of said points depending on the sense and amplitude of said angle, as illustrated in Figs. 5a and 5b.

It is apparent that within the invention the luminous signal or point intended to indicate the drift compensating angle or angle α may be produced in a similar manner in combination with arrangements of another copending application Serial No. 50,514, filed on September 22, 1948, in which two signal points such as 21 of Fig. 5 are limited in their displacements to a horizontal plane only, their spacing varying with distance and their lateral displacements indicating deviations of the craft to one or to the other side of the desired direction or axis of landing.

The schematic diagram of such an arrangement will be exactly the same as that of Fig. 4, except for the control applied by an absolute altimeter 19 on the vertical deflection plates of the cathode ray tube 12 which is to be used with.

In a similar way and in accordance with another embodiment of the invention, a luminous point serving to indicate the drift compensating angle may be introduced into another arrangement of the previously mentioned copending application Serial No. 51,442, filed on September 22, 1948, in which two distance points on the screen of the scope such as 21 on Fig. 5 are supplemented by a third central point adapted to move vertically as a function either of altitude or distance. In this embodiment this third point must be differentiated from the point indicating the drift compensating angle which may be accomplished for instance by giving to said points different colors or brightness.

The invention contemplates furthermore in connection with the above embodiments, the possibility of suppressing under certain conditions, the signal point indicating the drift compensating angle or angle α, as for instance when the distance points such as 21 in Fig. 5 come too closely to each other or when the altitude of the craft is too great.

The indication of the angle of drift compensation or in general angle α such as previously defined may be also obtained with three receiving aerials provided on the craft as indicated on Fig. 2 and adapted to cooperate with a transmission base comprising two synchronously operated frequency modulated transmitters in a manner similar to that described in the parent application Serial No. 51,028, filed on September 24, 1948. In such a case, the desired angle α may be indicated or determined by the measure of a beat frequency appearing in the circuit of the tail aerial when the craft changes its orientation to compensate for drift.

The invention provides thus a method and means for determining or indicating on a dirigible craft its angle of orientation with respect to a desired direction or a path followed by said craft. While several embodiments of the invention have been described and illustrated, it is to be understood that the invention is not specifically limited thereto and that various alternations and modifications evident to those skilled in the art may be produced therein without departing from the spirit of the invention.

What I claim is:

1. A system for determining and indicating the angle formed at every instant by the longitudinal axis of a craft and the path followed thereby more particularly toward a fixed point on the ground comprising means at said fixed point for transmitting in relation to a predetermined direction passing through said point signal energy radiations presenting a variable characteristic in azimuth, means for receiving said radiations on the craft at two spaced points on the longitudinal axis of said craft and means for comparing the effects of reception of said radiations at said points for producing the indication of said angle correlated with an indication of said path.

2. A system for determining and indicating the angle formed at every instant by the longitudinal axis of a craft and the path followed thereby more particularly toward a fixed point on the ground comprising means at said fixed point for transmitting in relation to a predetermined direction passing through said point signal energy radiations presenting a characteristic variable with time, means for receiving said radiations on the craft at three spaced points on the craft one of which is on longitudinal axis of the craft and two others on other side of a base line spaced from the first aerial along said axis and means for comparing the variations shown by said radiations upon their reception at said points for producing the indication of said angle together with the indications of distance of the craft to said transmitting means and lateral deviation of the craft with respect to said predetermined path relative to the ground passing through said transmitting means.

3. A system for determining and indicating the angle formed at every instant by the longitudinal axis of a craft and the path followed thereby more particularly toward a fixed point on the ground comprising means at said fixed point for transmitting in relation to a predetermined direction passing through said point signal energy radiations presenting a characteristic variable with time, means for receiving said radiations on the craft at four spaced points on the craft two of which are located on the longitudinal axis thereof and two others on either side of said axis and means for comparing the variations shown by said radiations upon their reception at said first two points on one hand and at said second two points on the other hand, for producing respectively the indication of said angle and the indications of distance of the craft to said transmitter means and of lateral deviation of the craft from said desired path passing through the point of location of said transmitting means.

4. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising at least two spaced independent aerials, means using the effects of reception of said aerials to determine the instants of sweeping of said aerials by said beam and means for relating on a time base said instants of reception for producing the indication of said angle.

5. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising at least two spaced independent aerials, means for producing a reference signal when the beam passes by a predetermined position relative to said desired path passing through the point of origin of said beam, means for receiving said reference signal on the craft, means using the effects of reception of said aerials to determine the instants of sweeping of said aerials by said beam and means for relating on a time base controlled by said reference signal said instants of reception for producing the indication of said angle.

6. A system according to claim 5 comprising two aerials located at two points aligned following the longitudinal axis of the craft for cooperation with the beam angularly movable in azimuth.

7. A system for determining and indicating the angle formed at every instant by the longitudinal axis of a craft and the path followed thereby more particularly toward a fixed point on the ground comprising means at said fixed point for transmitting in relation to a predetermined direction passing through said point signal energy radiations presenting a characteristic variable with time, means for receiving said radiations on the craft at least at two points spaced apart in a longitudinal direction with respect to said craft and means for comparing the effects of reception of said radiations by said aerials for producing an indication of said angle correlated with an indication of said path.

8. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising three independent aerials one of which is located on the longitudinal axis of the craft and two others on either side of said axis, means for producing a reference signal when the beam passes by a predetermined position relative to said desired path passing through the point or origin of said beam, means for receiving said reference signal on the craft, means using the effects of reception of said aerials to determine the instants of sweeping of said aerials by said beam and means for relating on a time base controlled by said reference signal said instants of reception for producing the indication of said angle together with indications of distance of the craft to said transmitting means and lateral deviation of the craft with respect to said predetermined path relative to the ground passing through said transmitting means.

9. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising four receiving aerials two of which are located on the longitudinal axis of the craft and two others on either side of said axis, means for producing a reference signal when the beam passes by a predetermined position relation to said desired path passing through the point of origin of said beam, means for receiving said reference signal on the craft, means using the effects of reception of said aerials to determine the instants of sweeping of said aerials by said beam and means for relating on a time base controlled by said reference signal said instants of reception for producing the indication of said angle together with indications of distance of the craft to said transmitting means and lateral deviation of the craft with respect to said predetermined path relative to the ground passing through said transmitting means.

10. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising at least two spaced independent aerials, means for producing a reference signal when the beam passes by a predetermined position relative to said desired path passing through the point of origin of said beam, means for receiving said reference signal on the craft, means using the effects of reception of said aerials to determine the instants of sweeping of said aerials by said beam and means including a cathode ray tube oscilloscope controlled by said reference signal and in response to said effects of reception for producing indication of said angle by luminous signals corresponding to the instants of passage of the beam by said aerials.

11. A system for determining and indicating the angle formed at every instant by the longitudinal axis of a craft and the path followed thereby more particularly toward a fixed point on the ground, which system comprises means for transmitting from said point a beam of radiant energy of a very high frequency adapted to move angularly in azimuth with a uniform speed about said point, means for receiving said beam on the craft comprising three independent aerials one of which is located on the longitudinal axis of the craft and two others on either side of said axis, means for producing a reference signal when the beam passes by a predetermined position relative to said desired path passing through the point of origin of said beam, means for receiving said reference signal on the craft, means using the effects of reception of said aerials to determine the instants of sweeping of said aerials by said beam, means including a cathode ray tube oscilloscope, a time base device controlled by said reference signal for causing the sweeping following one axis of said oscilloscope and means for controlling said oscilloscope in response to said effects of reception for producing on the screen thereof luminous signals corresponding to the instants of passage of the beam by said aerials and which by their relative position on said screen give an indication of said angle as well as of the distance of the craft to the point of origin of the beam and of the lateral deviation of the craft from the desired path passing through said point of origin.

12. A system as claimed in claim 11 in which the indication of distance and of lateral deviation of the craft are given by two signals horizontally spaced apart whilst the indication of said angle is given by a normally centred signal which, according to the sense and the amplitude of said angle, is displaced laterally from said centred position.

13. A system as claimed in claim 11 in which the indications of distance and of lateral deviation of the craft are given by two signals horizontally spaced apart and movable vertically in response to the altitude to be maintained as a function of distance to a desired point whilst the indication of said specified angle is given by a normally centred signal which, according to the sense and amplitude of said angle, is displaced laterally from said position, said signal being displaced vertically with the other two signals.

14. A system as claimed in claim 11 in which the indications of distance and of lateral deviation of the craft are given by two signals horizontally spaced apart and movable vertically in response to the actual altitude of the craft or an altitude to be maintained as a function of distance to a desired point, said signals cooperating with a third signal vertically movable in response to one or the other of the above functions and in which the indication of the specified angle is given by a fourth signal normally centred between said distance signals, said fourth signal being differentiated by its form, colour or brightness from said third signal.

15. A system as claimed in claim 11 in which the indication of the desired angle is produced by signal normally centred on the screen of the oscillocope between two signals giving the indication of distance and the lateral deviation of the craft together with an indication of altitude to be maintained by the craft as a function of distance to a given point or of the actual altitude of the craft which indication is given by vertical displacements of said signals, said desired signal of angle being movable vertically with said distance signals and in which means are provided for suppressing the signal of angle upon excessive vertical displacement of said distance points.

16. A system for determining and indicating the angle formed at every instant by the longitudinal axis of a craft and the path followed thereby more particularly toward a fixed point on the ground, which system comprises means for transmitting synchronously related radiations presenting a periodically variable characteristic from two points symmetrically disposed on either side of a desired direction and means for receiving said radiations on the craft comprising at least two independent aerials spaced apart in a longitudinal direction with respect to the craft and means for using the effects of reception of said aerials to provide an indication of said angle correlated with the indication of said path.

17. A system for determining and indicating the angle formed at every instant by the longitudinal axis of a craft and the path followed thereby more particularly toward a fixed point on the ground comprising means for transmitting synchronously related frequency modulated radiations from two points symmetrically disposed on either side of said path and means for receiving said radiations on the craft to provide an indication of said angle comprising at least two independent aerials spaced apart along the longitudinal axis of said craft, means for measuring differences of frequencies received by each aerial from both transmitters simultaneously and means for showing the difference of said differences of frequencies to provide an indication of said angle correlated with the indication of said path.

18. A system for determining and indicating the angle formed at every instant by the longitudinal axis of a craft and the path followed thereby more particularly toward a fixed point on the ground comprising means for transmitting synchronously related frequency modulated radiations from two points symmetrically disposed on either side of said path and means for receiving said radiations on the craft comprising three spaced independent aerials one of which located on the longitudinal axis of the craft and the other on either side of said axis, means for measuring differences of frequencies received by each of said aerials from both transmitters simultaneously, means for indicating said angle by measuring the beat frequency received on said aerial on the longitudinal axis of the craft and means for using said frequency differences received by said two lateral aerials for measuring the distance of the craft to the transmission base line and for guiding the craft along said path correlated with the indication of said path.

PIERRE PÉRILHOU.

References Cited in the file of this patent

UNITED STATES PATENTS

| Number | Name | Date |
|---|---|---|
| Re. 23,050 | Brunner | Nov. 23, 1948 |
| 1,890,786 | Johnston | Dec. 13, 1932 |
| 2,010,968 | Smith | Aug. 13, 1935 |
| 2,257,320 | Williams | Sept. 30, 1941 |
| 2,451,823 | Guanella | Oct. 19, 1948 |
| 2,479,567 | Hallman | Aug. 23, 1949 |
| 2,528,543 | Peterson et al. | Nov. 7, 1950 |
| 2,539,405 | Deloraine et al. | Jan. 30, 1951 |